3,161,652
5,5-DISUBSTITUTED-N³-CARBO(LOWER) ALKOXYHYDANTOINS
Hideji Takamatsu, Amagasaki-shi, Hyogo-ken, Susumu Umemoto, Sakai-shi, Osaka-fu, Katsuro Fujimoto, Neyagawa-shi, Osaka-fu, and Keiji Nakamura, Amagasaki-shi, Hyogo-ken, Japan, assignors to Dainippon Pharmaceutical Co., Ltd., Osaka, Japan, a corporation of Japan
No Drawing. Filed Aug. 20, 1963, Ser. No. 303,418
Claims priority, application Japan, Sept. 12, 1962, 37/39,217
3 Claims. (Cl. 260—309.5)

This invention relates to novel N³-substituted hydantoin derivatives and process for producing thereof. More particularly, the invention relates to the compounds having anticonvulsant activity, which can be represented by the formula:

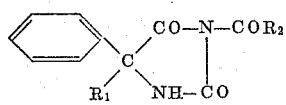

in which $R_1$ is a member selected from the group consisting of phenyl and lower alkyl having 1 to 3 carbon atoms; $R_2$ is a member selected from the group consisting of alkoxy having 1 to 3 carbon atoms, lower alkyl having 1 to 3 carbon atoms, phenyl and benzyl.

The alkyl radicals encompassed by $R_1$ are exemplified by methyl, ethyl, propyl and isopropyl. The alkoxy radicals encompassed by $R_2$ are exemplified by methoxy, ethoxy, propoxy and isopropoxy. The alkyl radicals encompassed by $R_2$ are exemplified by methyl, ethyl, propyl and isopropyl.

N³-substituted hydantoin derivatives of this invention are useful as anticonvulsant agents. Animal experiments indicate that the compounds have a remarkable anticonvulsant activity by oral route of administration. The main feature of the activity is effectiveness of the compounds against both convulsions induced by metrazol injection and maximal electroshock applied through corneal electrode in rats and mice. The effects persist for 24 to 48 hours. This suggests usefulness of the compounds for the treatment of epileptic patients, which is clinically assured.

N³-substituted hydantoin derivatives of this invention can be prepared by the reaction taking place as follows:

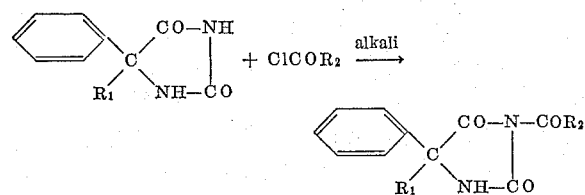

in which $R_1$ and $R_2$ have the same significances as above.

This reaction is effected by reacting hydantoin derivatives with alkyl chloroformate or acylchloride in the presence of alkali. In substitution for reacting in the presence of alkali, the reaction is advanced likewise by using alkali salt of hydantoin derivatives from the first. In this reaction an inert solvent such as ether and benzene may be used. It is apparent that alkyl chloroformate and acylchloride may be present in equimolar quantities or in excess. In the latter case, alkyl chloroformate and acylchloride can serve as the reaction medium as well. This reaction may be effected at room temperatures, but preferably by heating for a while. The solvent and the excess of alkyl chloroformate and acylchloride is distilled off and the residue is recrystallized from suitable solvent to give intended compound.

The following examples are given to illustrate the practice of the present invention, but are not to be construed as limiting.

Example 1

21 g. of ethyl chloroformate is added to 27.6 g. of 5,5-diphenylhydantoin sodium, followed by refluxing for 30 minutes on water bath. After distilling off the excess of ethyl chloroformate, water is added to the residue and cooled to give crude crystal. The crude crystal is recrystallized from isopropanol to give 25.0 g. of white needle crystalline 5,5-diphenyl-N³-carboethoxyhydantoin, M.P. 139–140° C.

Example 2

21.6 g. of ethyl chloroformate is added to a suspension of 22.6 g. of 5-phenyl-5-ethylhydantoin sodium in 100 cc. of dry benzene with stirring, followed by refluxing for 30 minutes on water bath. After cooling, the mixture is washed with water and medium is removed by distillation. The residue is recrystallized from ethanol to give 23.0 g. of white needle crystalline 5-phenyl-5-ethyl-N³-carboethoxyhydantoin, M.P. 99–101° C.

Example 3

4.0 g. of acetylchloride is added to a suspension of 13.7 g. of 5,5-diphenylhydantoin sodium in 100 cc. of dry benzene with stirring, followed by refluxing for 30 minutes. After filtering the hot solution, benzene is removed by distillation. A small amount of ether is added to the residue to give crude crystal. The crude crystal is recrystallized from benzene-ligroin to give 9.0 g. of white needle crystalline 5,5-diphenyl-N³-acetylhydantoin, M.P. 133–135° C.

Example 4

Substitution of 11.3 g. of 5-phenyl-5-ethylhydantoin for 5,5-diphenylhydantoin in Example 3 affords 7.5 g. of white needle crystalline 5-phenyl-5-ethyl-N³-acetylhydrantoin, M.P. 99–101° C. (recrystallized from ethanol).

Example 5

7.7 g. of phenylacetylchloride is added to a suspension of 13.7 g. of 5,5-diphenylhydantoin sodium in 50 cc. of dry benzene with stirring, followed by refluxing for one hour. After filtering the hot solution, benzene is removed by distillation. The residue is recrystallized from benzene to give 12.0 g. of white needle crystalline 5,5-diphenyl-N³-phenylacetylhydantoin, M.P. 150–152° C.

Example 6

14.0 g. of benzoylchloride is added to a suspension of 27.4 g. of 5,5-diphenylhydantoin sodium in 100 cc. of dry benzene with stirring, followed by refluxing for one hour. After filtering the hot solution, benzene is removed by distillation. The residue is recrystallized from benzene to give 16.0 g. of white prism crystalline 5,5-diphenyl-N³-benzoylhydantoin, M.P. 155–158° C.

What is claimed is:
1. A compound of the following formula

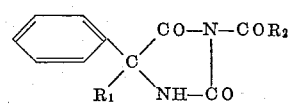

in which $R_1$ is a member selected from the group consisting of phenyl and alkyl having 1 to 3 carbon atoms; and $R_2$ is alkoxy having 1 to 3 carbon atoms.
2. 5,5-diphenyl-N³-carboethoxyhydantoin.
3. 5-phenyl-5-ethyl-N³-carboethoxyhydantoin.

(References on following page)

References Cited by the Examiner

Bornwater Recueil des Travaux Chimiques De Pays-Bass, Vol. 31, pages 131–32 (1912).

Freter et al.: Liebigs Annalen der Chemie, Vol. 607, page 184 (1957).

Kulev et al.: Zurnal Obschei Khimii, Vol. 31, pages 1378–81 (1961).

Besa: Chemical Abstracts, Vol. 44, page 10906 b (1960) (abstract of Rev. real Acad. Cienc exact fis y nat Madrid, Vol. 43, pages 193–225 (1949).

Duynstee et al.: Recueil des Travaux Chimiques des Pays-Bas, Vol. 81, pages 241–54 (1962).

Chemical Abstracts, Fifth Decennial Index, Vols. 41–50, Subjects Hy-Ly, page 6196 s (1961).

Richter: Organic Chemistry (Vol. 1, Chemistry of the Aliphatic Series), pages 485–86, 3rd Edition, New York, Elsevier, 1934.

Heymons et al: German application 1,067,822; printed October 29, 1959.

IRVING MARCUS, *Primary Examiner.*

NICHOLAS S. RIZZO, *Examiner.*